Figure 1:
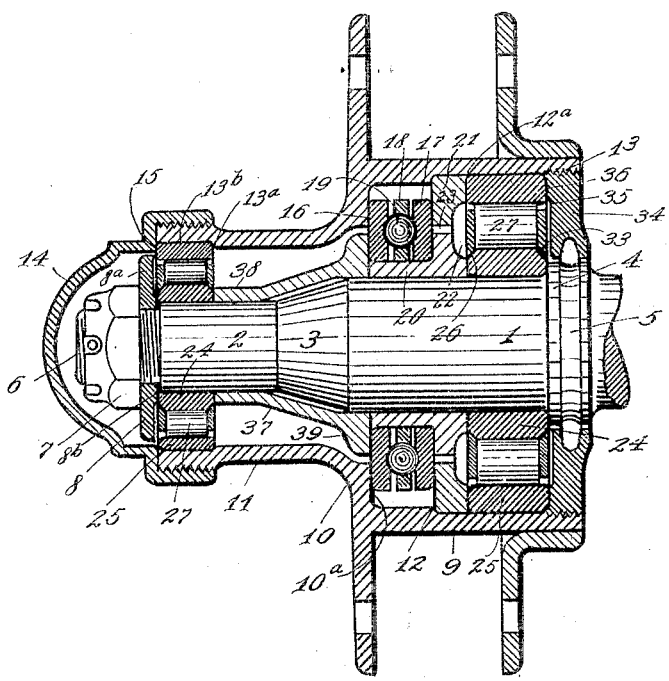

M. REID.
BEARING.
APPLICATION FILED FEB. 10, 1912.

1,076,701.

Patented Oct. 28, 1913.
2 SHEETS—SHEET 1.

WITNESSES:

INVENTOR
Marcellus Reid
BY
ATTORNEYS.

M. REID.
BEARING.
APPLICATION FILED FEB. 10, 1912.
1,076,701.
Patented Oct. 28, 1913.
2 SHEETS—SHEET 2.
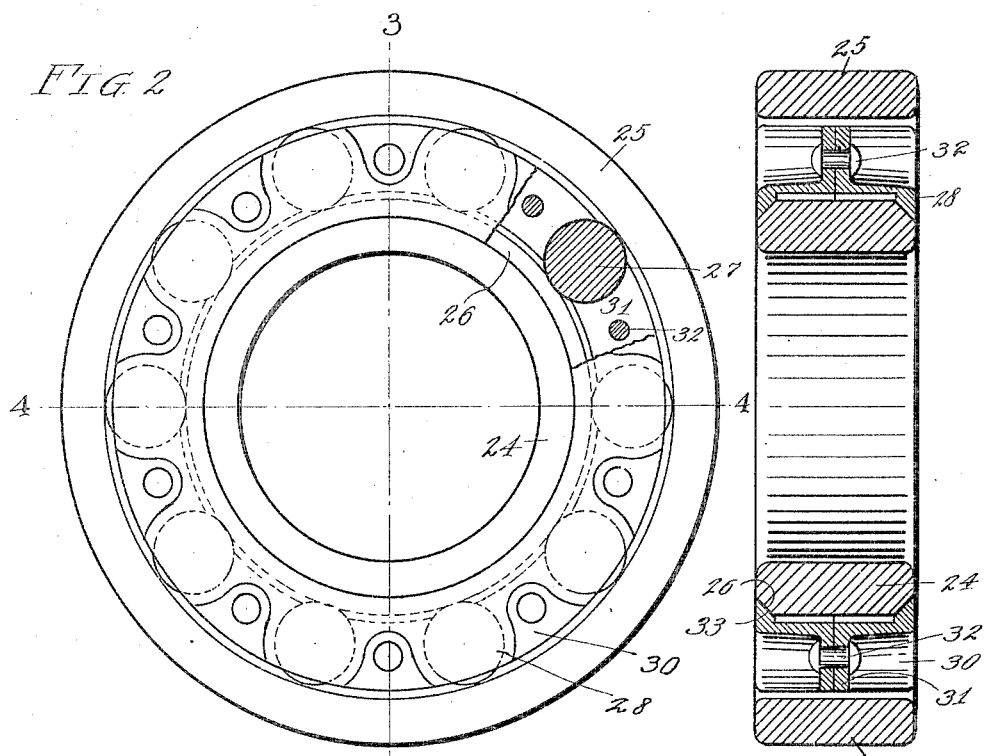
Fig. 2
Fig. 3
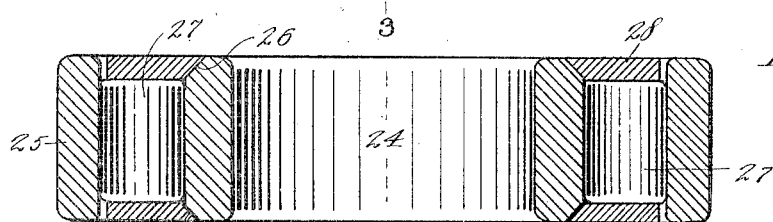
Fig. 4
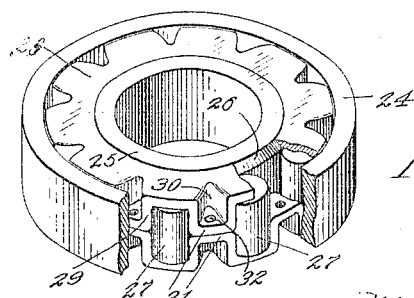
Fig. 5
WITNESSES:
Brennan B. West
Chas. C. Watt
INVENTOR
Marcellus Reid
BY
Hull Smith
ATTORNEYS

UNITED STATES PATENT OFFICE.

MARCELLUS REID, OF CLEVELAND, OHIO.

BEARING.

1,076,701.　　　　Specification of Letters Patent.　　　Patented Oct. 28, 1913.

Application filed February 10, 1912.　Serial No. 676,751.

*To all whom it may concern:*

Be it known that I, MARCELLUS REID, a citizen of the United States, residing at Cleveland, in the county of Cuyahoga and State of Ohio, have invented a certain new and useful Improvement in Bearings, of which the following is a full, clear, and exact description, reference being had to the accompanying drawings.

This invention relates to bearings, and more particularly to bearings of the annular roller bearing type which are interchangeable with all of the present annular bearings of standard sizes.

A general object of the invention is to provide a bearing of this type that is particularly efficient in operation but is simple and inexpensive of construction.

Further objects of the invention are to produce an interchangeable unit bearing embodying the combination of an outer ring, an inner ring, a set of rollers interposed between said rings, and a cage for said rollers having means for preventing the cage and rollers from sliding out of the bearing while providing sufficient clearance between the lateral faces of said cage and the side walls of the chamber in which the baring may be located to prevent thrust on said cage.

A further object of the invention is to provide a special hub mounting, of which the aforesaid roller bearings form a part and which construction is peculiarly well adapted to take up the lateral and radial thrust between the hub and axle.

A further object of the invention is to provide a coöperating construction and arrangement of bearings whereby the inner and outer rings of the roller bearings are firmly located against the axial movement or play and whereby all the inner and outer members of the bearings may be locked, thereby giving a rigidity and durability to the bearings.

Generally speaking, the invention may be defined as consisting of the combinations of elements embodied in the claims hereto annexed and illustrated in the drawings forming part hereof, wherein—

Figure 1 shows a longitudinal sectional view of the hub with a spindle therein having my improved mounting and bearings applied thereto; Fig. 2 represents an end view of a bearing; Fig. 3 represents a sectional view of a bearing corresponding to the line 3—3 of Fig. 2; Fig. 4, a view corresponding to the line 4—4 of Fig. 2; and Fig. 5 a perspective view of the bearing, with part of the outer ring and cage broken away to show the construction.

Describing the parts by reference characters, 1 denotes the inner cylindrical portion and 2 the outer cylindrical portion of an automobile spindle or axle of a well known construction, the cylindrical portions being connected by a frusto-conical portion 3 and there being a radially projecting flange 4 at the inner end of the cylindrical portion 1. This flange is provided with an annular groove 5. The outer portion of the spindle is provided with the usual reduced threaded end 6 for the application of a nut 7 and a washer 8. With the spindle, a hub mounting comprising an outer shell and a series of bearings and inner rings is employed. The outer hub shell comprises a cylindrical inner portion 9 connected by a radially projecting flange or shoulder 10 with the outer cylindrical portion 11. The hub section 9 is provided with an annular recess 12$^a$ extending outwardly from the inner end thereof and having a shoulder 12 at its outer end, the inner end of the recess being interiorly threaded as shown at 13. The outer end of the hub shell is provided with an annular recess projecting inwardly from the outer end thereof, there being a radially directed shoulder 13$^a$ at the inner end of said recess. The outer end of the hub section 11 is threaded for the application of a dust cap 14 and this dust cap is provided with a radially directed shoulder 15, for a purpose to be described.

Within the inner section of the hub shell there are located the following parts: 16 and 17 denote lateral ball race rings having therebetween a cage 18 and balls 19, the parts comprising a ball bearing adapted to take the lateral thrust between the hub and spindle. The bearing is seated on a reduced cylindrical portion 20 of an annular ring which is adapted to surround the cylindrical portion 1 of the spindle, the radially projecting flange 21 of said ring being seated within the outer end of the recess 12$^a$ and abutting against the shoulder 12. The radially projecting flange 20 is provided with an annular recess 22 in its inner face, there being ports 23 extending laterally through said flange in proximity to the ball bearings 17, the construction providing means for holding and supplying a lubricant to the parts on both sides of the flange 21 as well as providing clearance for the lateral surface of the adjacent roller bearing cage. A roller bearing is located between the flange 21 and the inner end of the recess 12ª. This bearing comprises an inner ring 24 and an outer ring 25. The lateral edges of the outer cylindrical surface of the inner ring 24 are beveled off, as shown at 26, for purposes to be described in connection with the cage. Interposed between the rings 24 and 25 are the rollers 27, said rollers being mounted within a cage and said cage being cheaply and conveniently formed from pressed or cast metal made in two complementary parts so shaped as to form pockets for the rollers and to provide means whereby the parts may be conveniently assembled and, when so assembled, the rollers and cage will remain in place between the rings 24 and 25 without any liability to end thrust upon the rollers and cage. This cage, as will appear more particularly from the detail views on Sheet 2, consists of two symmetrical sections 28, each section having a plurality of half-pockets 29 therein which, when the sections are connected, form complete pockets wherein the rollers are retained in such manner as to bear aginst the inner and outer rings 24 and 25 and to roll freely within the pockets. Between the half pockets 29, the metal of the cage sections is deflected or pressed in a direction substantially parallel to the length of the rollers, to form reëntrant recesses 30, the bottoms of which recesses are flattened, as shown at 31, thereby forming abutting surfaces or flanges for the cage sections, permitting said sections to be secured together, through such flanges or surfaces, as by means of rivets 32. The parts are so proportioned that the lateral faces of the cage sections will not project beyond the lateral faces of the rings 24 and 25, and, in order to prevent any displacement of the cage and rollers with respect to said rings, the inner edges of the lateral faces of the cage sections are beveled, as shown at 33, complementarily to the beveled surfaces 26.

A roller bearing of the type just described is shown applied to the recess 12ª with the rings 24 and 25 abutting against the lateral surfaces provided on each side of the recess 23 and with the inner lateral face of the ring 24 abutting against the flange 4. The roller bearing is retained in place in the recess by means of an end thrust ring 34, screwed into the inner end of the recess 12ª, said ring being recessed at 35 to provide clearance for the roller cage and having a bearing surface 36 adapted to abut against the adjacent lateral surface of the outer ring 25.

37 denotes a generally frusto-conical collar which surrounds the corresponding portion 3 of the spindle and is provided with a cylindrical extension 38 at its outer end. The collar 37 is provided with a radially projecting flange 39, the inner surface of which forms in effect a continuation of the inner surface 10ª of the flange 10, said inner surface being adapted to take the lateral thrust of the ring 16. The outer end of the collar 37 is in alinement with the shoulder 13ª. Surrounding the outer end 2 of the spindle and located in the seat provided between the outer end of the ring 37, the washer 8, the recess 13ᵇ at the outer end of the hub 11 and the inwardly projecting flange 15 of the dust cap, is a smaller roller bearing identical in construction with the larger one shown at the inner end of the hub, the corresponding parts of the bearings being designated by like numerals. The washer 8 is provided with a recess 8ª to provide clearance for the cage of this bearing and with a surface 8ᵇ adapted to take the lateral thrust of the ring 24.

With the hub mounting constructed as described, it will be evident that the roller bearings provided at the inner and outer ends of the hub will take the radial thrust only; that the lateral thrust will be taken by the ball bearing comprising the parts 16 to 20; that on a movement of the hub inwardly this thrust will be transmitted from the flange 10 diagonally across the balls 19 to the radial flange 21, and that on a movement of the hub outwardly, the thrust will be transmitted diagonally across the balls 19 from the radial flange to the flange 39 of the collar 37; and that the parts beginning with the nut 7 and including the washer 8, ring 24, collar 37 and rings 20, form in effect a continuous inner hub mounting surrounding the spindle and bearing against the flange 4 thereof; also that the parts beginning with the outer ring of the innermost roller bearing and including the flange 21, outer hub shell 11, shoulder 13ª, and the outer ring of the outermost ball bearing, constitute a substantially continuous connection between the thrust ring 34 and the flange 15 of the dust cap. Furthermore, it will be apparent that the roller bearings are not only capable of withstanding all radial thrust exerted thereupon, but, by their construction and the construction of the coöperating parts, the rollers are absolutely protected against lateral thrust and that the rollers of these bearings are positively retained in place without any liability to displacement.

Having thus described my invention, what I claim is:

1. In a roller bearing, the combination of an inner bearing ring, a two-part cage comprising symmetrical sections each having half-pockets therein adapted to receive rollers therewithin, with inwardly projecting portions between said half-pockets adapted to abut and provide means for securing said sections together, an outer bearing ring adapted to surround the inner ring and the cage, one of said rings having beveled edges and the cage having beveled edges overhanging and coacting with the beveled edges of the ring, the cage sections being adapted for assembly from opposite sides of said bearing, substantially as specified.

2. In a roller bearing, the combination of an inner bearing ring, a two-part cage comprising symmetrical sections each having half-pockets therein adapted to receive rollers therewithin, the metal of the cage sections between said pockets being deflected inwardly to form reëntrant recesses, said recesses extending inwardly from the outer periphery of each section and having their bottoms abutting to provide means for securing said sections together, an outer bearing ring adapted to surround the inner bearing ring and the cage, the inner ring having beveled edges and the inner unbroken periphery of each cage section being beveled to overhang and coöperate with a beveled edge of said ring, the cage sections being adapted for assembly from opposite sides.

In testimony whereof, I hereunto affix my signature in the presence of two witnesses.

MARCELLUS REID.

Witnesses:
BRENNAN B. WEST,
HAROLD S. SMITH.